UNITED STATES PATENT OFFICE.

ARTHUR LIEBRECHT, OF BRESLAU, ASSIGNOR TO THE FARBWERKE, VORMALS MEISTER, LUCIUS & BRÜNING, OF HÖCHST-ON-THE-MAIN, GERMANY.

BASIC BISMUTH GALLATE.

SPECIFICATION forming part of Letters Patent No. 495,497, dated April 18, 1893.

Application filed June 25, 1891. Serial No. 397,519. (Specimens.)

*To all whom it may concern:*

Be it known that I, ARTHUR LIEBRECHT, doctor of philosophy, a citizen of the Empire of Germany, residing at Breslau, in the Empire of Germany, have invented certain new and useful Improvements in the Production of Basic Gallate of Bismuth; and I do hereby declare the following to be a full, clear, and exact description of the invention, such as will enable others skilled in the art to which it appertains to make and use the same.

This invention relates to the production of basic gallate of bismuth, a compound of gallic acid not known before, that possesses prominent antiseptic qualities and being without smell, may be used as a substitute for iodoform.

In carrying out my invention I proceed as follows: Forty-eight parts by weight of neutral nitrate of bismuth are dissolved in diluted nitric acid and thereto is added a solution of nineteen parts by weight of gallic acid in forty parts by weight of alcohol and twenty parts by weight of water. To the mixture is added caustic alkali, alkali carbonate or the like, until the whole remains but slightly acid. On the addition of acetate of soda and even on diluting with water, precipitation takes place. The precipitate thus obtained is basic gallate of bismuth having the formula:

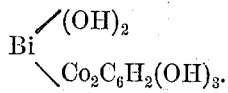

Of bismuth, which according to theory should amount to 50.4 per cent., 49.4 per cent. are found in the product, which is in the form of a yellow powder insoluble in water and in diluted acids. For the gallic acid in the above example may be substituted any of its neutral salts, which are soluble in water.

The compound herein described is a real basic gallate of bismuth oxide containing from fifty-five to fifty-six per cent. of bismuth oxide and it has the formula

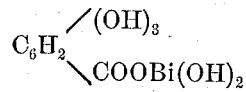

which has 56.21 per cent. of bismuth oxide.

Having thus described my invention and in what manner it can be performed, that what I claim as new and of my invention is—

1. The process herein described for producing basic gallate of bismuth oxide which consists in dissolving neutral nitrate of bismuth in diluted nitric acid, adding thereto a solution of gallic acid, alcohol and water and to this mixture adding caustic alkali, alkali carbonate, or the like, until the whole remains but slightly acid and then precipitating, by means of acetate of soda or by diluting with water substantially as set forth.

2. As a new article of manufacture basic gallate of bismuth oxide, derived from bismuth and gallic acid; a yellow powder, without odor, insoluble in water, diluted acids, alcohol and ether and soluble in a large excess of mineral acids and containing fifty-five to fifty-six per cent. of bismuth oxide, substantially as set forth.

In testimony whereof I affix my signature in presence of two witnesses.

ARTHUR LIEBRECHT.

Witnesses:
ERNEST JAECKEL,
MINIE SKIBO.